United States Patent
Eberle et al.

(10) Patent No.: US 9,461,332 B2
(45) Date of Patent: Oct. 4, 2016

(54) LAGP GLASS CERAMICS

(71) Applicants: Robert Bosch GmbH, Stuttgart (DE); FM LAB, Zelenograd, Moscow (RU)

(72) Inventors: Felix Eberle, Kyoto (JP); Daniil Itkis, Dubna (RU); Lev Trusov, Obninsk (RU); Victor Vizgalov, Moscow (RU)

(73) Assignees: Robert Bosch GmbH, Stuttgart (DE); FM LAB, Zelenograd, Moscow (RU)

( * ) Notice: Subject to any disclaimer, the term of this patent is extended or adjusted under 35 U.S.C. 154(b) by 0 days.

(21) Appl. No.: 14/657,053

(22) Filed: Mar. 13, 2015

(65) Prior Publication Data
US 2015/0263380 A1 Sep. 17, 2015

(30) Foreign Application Priority Data
Mar. 13, 2014 (EP) .................... 14159471

(51) Int. Cl.
| | |
|---|---|
| *H01M 10/0562* | (2010.01) |
| *H01M 10/052* | (2010.01) |
| *H01M 8/10* | (2016.01) |
| *C01B 25/45* | (2006.01) |
| *C03C 4/14* | (2006.01) |
| *C03C 4/18* | (2006.01) |
| *C03C 10/00* | (2006.01) |
| *H01M 12/08* | (2006.01) |

(52) U.S. Cl.
CPC .......... *H01M 10/0562* (2013.01); *C01B 25/45* (2013.01); *C03C 4/18* (2013.01); *C03C 10/00* (2013.01); *H01M 8/10* (2013.01); *H01M 10/052* (2013.01); *H01M 12/08* (2013.01); *H01M 2300/0068* (2013.01); *H01M 2300/0071* (2013.01); *Y02E 60/122* (2013.01); *Y02E 60/521* (2013.01); *Y02P 70/54* (2015.11)

(58) Field of Classification Search
None
See application file for complete search history.

(56) References Cited

U.S. PATENT DOCUMENTS

| | | |
|---|---|---|
| 5,510,209 A | 4/1996 | Abraham et al. |
| 2013/0026409 A1 | 1/2013 | Baker et al. |

FOREIGN PATENT DOCUMENTS

| | | |
|---|---|---|
| DE | 10 2012 207 424 B3 | 6/2013 |
| EP | 0 838 441 A2 | 4/1998 |
| EP | 1 261 048 A2 | 11/2002 |

OTHER PUBLICATIONS

Christensen et al.; A Critical Review of Li/Air Batteries; Journal of The Electrochemical Society; 2012; pp. R1-R30; vol. 159, No. 2; The Electrochemical Society.
Xu et al.;Lithium Ion-Conducting Glass—Ceramics of Li 1.5 Al 0.5 Ge 1.5 (PO4)3—xLi 2 0 (x=0.0-0.20) with Good Electrical and Electrochemical Properties; J. Am. Ceram. Soc.; 2007; pp. 2802-2806; vol. 90, No. 9; The American Ceramic Society.
H. Rawson; Glass and its history of service; IEE Proceedings; Jul. 1988; pp. 325-345; vol. 135, Pt. A—Issue No. 6; IEE Review.

*Primary Examiner* — Yoshitoshi Takeuchi
(74) *Attorney, Agent, or Firm* — Maginot, Moore & Beck LLP

(57) ABSTRACT

A solid electrolyte, particularly a lithium-conductive solid electrolyte, can be obtained from a glass-ceramics process. A glass-ceramics process can be used to produce a solid electrolyte, particularly a lithium-conductive solid electrolyte. The solid electrolyte can be LAGP, i.e. $Li_{1+x}Al_xGe_{2-x}(PO_4)_3$ modified by a crystallization nucleation agent.

12 Claims, 3 Drawing Sheets

LAGP GLASS CERAMICS

This application claims priority under 35 U.S.C. §119 to patent application no. EP 14 159 471.3, filed on Mar. 13, 2014 in Germany, the disclosure of which is incorporated herein by reference in its entirety.

The present disclosure is related to a solid electrolyte, particularly lithium-conductive solid electrolyte obtained in a glass-ceramics process and a method for synthesizing same.

BACKGROUND

U.S. Pat. No. 5,510,209 is related to a solid polymer electrolyte-based oxygen battery. A polymer-based battery comprises metal anodes and an oxygen gas cathode. The oxygen is not stored in the battery but rather it accesses the battery from the environment. The solid-state battery is constructed by sandwiching a metal ion-conductive polymer electrolyte film between a metal anode (negative electrode) and a composite carbon electrode which serves as the cathode current collector on which the electro-active oxygen is reduced during discharge of the battery to generate electric current. The metal anodes include lithium, magnesium, sodium, calcium and zinc.

EP 1 261 048 81 is related to an electrode/separator laminate for galvanic cells and a process for its manufacture. According to the method disclosed in EP 1 261 048 81, a method is provided for producing an electrode/separator laminate for electrochemical elements which contains at least one lithium-intercalating electrode, which is composed of a PVdF-HFP-copolymer, wherein an electrochemically active material, which is insoluble in polymer, is finely dispersed.

The PVdF-HFP-copolymer is dissolved in a solvent and is mixed with electrochemically active materials. The pasty substance obtained in this way is extruded to form a sheet and is then laminated to a polyolefin separator which is coated with PVdF-HFP-copolymer. In each case, a PVdF-HFP-copolymer is used, having a proportion of HFP of less than 8% by weight. It appears to be very likely that in future battery systems, such as consumer or stationery application systems will be developed which are not based on intercalation, such as the established lithium/ion-technology. A promising battery technology which is in development is the Lithium/Air or Lithium/Oxygen system which makes use of a conversion process instead of an intercalation. Lithium/Air battery cells contain a metallic anode and an oxygen electrode and therefore realize a high specific energy cell level. A system with a metallic lithium-anode and an oxygen-electrode is described in afore-mentioned U.S. Pat. No. 5,510,209.

State of the art in electrode manufacturing processes are electrode binders such as polyvinylidene difluoride (PVdF) or polyvinylidene difluoridehexafluoropropylene (PVdF-HFP). Such polymer binders provide good adhesion between microscopic particles, however, establish electrical insulators. This in turn means that a composite electrode containing PVdF may show a decreased load capacity. Polymer electrode binders such as PVdF-HFP are well described in the literature as briefly has been discussed in EP 1 261 048 B1.

Electrode binders such as PVdF establish electrical insulators and even a few mass-% in the electrode composite may decrease the loading capacity of a battery cell considerably. If in battery cell designing, using electrode insulation material is disclaimed, one can only achieve very low loading by coating layers having a thickness between 100 nm and 1000 nm (1 μm). With such low loadings of active material, battery cells cannot be commercialized, because of the disadvantageous ratio between active and passive materials, not to name but a few such as collector foil, electrolyte and separators. For Lithium/Air technology under development, the level of carbon loading on the cathode (of oxygen electrodes) is limited to 1000 nm (1 μm). Above this thickness, the carbon atoms become unstable and show poor adhesion between the carbon particles and between carbon electrodes and metallic materials, such as the foil.

Taking into account theoretical and practical limitations of modern lithium-ion battery technology development, new approaches to increase battery performance are necessary. A promising approach is new battery electrochemical designs utilizing metal lithium as an electrode. Examples for this new electrochemical battery design are the system Lithium-Air/Lithium-Oxygen, Lithium-Sulphur, metal lithium-polymer. These technologies can achieve high specific energy. In the current state of the art, several problems have to be solved in each new battery electrochemical design. The problem of metal lithium protection is the most urgent one.

A review on current challenges for the system lithium/air was published in 2012 by Jake Christensen et al. in Journal of the electrochemical society, 159(2), R1R30 (2012). In this review, as the most promising way to protect lithium, are mentioned amongst others, lithium-conductive solid electrolytes. A huge list of lithium-conductive electrolytes has been narrowed to several variants due to the physical environment conditions of batteries: for example, a high lithium-ion conductivity is required, particularly higher than $10^{-4}$ $Ohm^{-1}cm^{-1}$ at room temperature (RT). Chemical and electrochemical stability, gas tightness, overall good mechanical properties, are required as well.

Among all, lithium-conductive solid electrolytes, only NASICON-based (Na Super-ionic Conductor) LATP ($Li_{1+x}Al_xTi_{2-x}(PO_4)_3$) and LAGP (($Li_{1+x}Al_xGe_{2-x}(PO_4)_3$) (wherein x is equal to or greater than 0 and equal to or less than 2) are suitable. However, LATP is reported to be electrochemically not stable in contact with metallic lithium.

LAGP solid electrolytes are synthesized in two variants: ceramics and glass-ceramics. While NASI CON-based ceramics are the more explored of the materials, it allows very few ways to tailor material properties. Glass-ceramic is more promising due to initial built into gas tightness, being legacy of glass. Nevertheless, glass-ceramics electrolyte production is more complicated: non-uniform crystallization of glass results in a non-homogeneous distribution of such functional properties as ionic conductivity, thereby significantly decreasing performance of a battery. In addition, to uniform a glass crystallization of LAGP, a production of glass-ceramic with small crystal size is necessary for a creation of suitable solid electrolyte to be applied in lithium/air, lithium/sulphur and metallic lithium/polymer-batteries.

SUMMARY

An object of the present disclosure is to obtain uniform membranes of LAGP, i.e. a $Li_{1+x}Al_xGe_{2-x}(PO_4)_3$ solid electrolytes for battery cells.

According to the present disclosure, uniform membranes of LAGP solid electrolytes are obtained when crystal nucleation agents are used which are able to crystallize in a glass system prior to the crystallization of the main lithium-conductive phase. Such additives also have to be inert in a glass matrix, not utilizing the main phase component during crystallization.

In particular, advantageous embodiments two groups of crystal nucleation agents are suitable for the LAGP ($Li_{1+x}Al_xGe_{2-x}(PO_4)_3$): metals, such as Au, Pt, and Ag and inert ceramics, such as $Y_2O_3$. These additives are chemically and electrochemically stable. Modified glass ceramic electrolytes demonstrate a significantly higher ionic conductivity.

According to the present disclosure, electrolyte-samples, containing 5% of $Y_2O_3$ annealed at 750° C. for two hours, show a conductivity of $5 \cdot 10^{-4}$ $Ohm^{-1}cm^{-1}$ which is up to five times higher than an electrolyte sample, which has not been modified neither by a metal, such as Au, Pt or Ag nor by inert ceramics, such as $Y_2O_3$.

Still further, it is worth mentioning, that solid electrolyte membranes of LAGP solid electrolyte are gas tight, thereby showing a promising way to protect metal lithium in batteries for commercial use in Hybrid Electrical Vehicles (HEV), in Plug-in Hybrid Electrical Vehicles (PHEV) or in Electric Vehicles (EV).

Main advantage of the crystallization technique according to the present disclosure is the ability to tailor LAGP particle size (and thereby electrolyte ionic conductivity) in aggregate with good volumetric uniformity of glass-ceramic membranes. In addition, LAGP particle sizes that were obtained via the crystallization process according to the present disclosure are far less than that obtained in other 30 variants. This technique also allows crystallizing uniformly thin glass membrane samples without any bending which in turn allows for lowering the thickness of a layer to be polished.

BRIEF DESCRIPTION OF THE DRAWINGS

The present disclosure is further described herein below at hand of the accompanying drawings, wherein.

DETAILED DESCRIPTION

Figure 1:
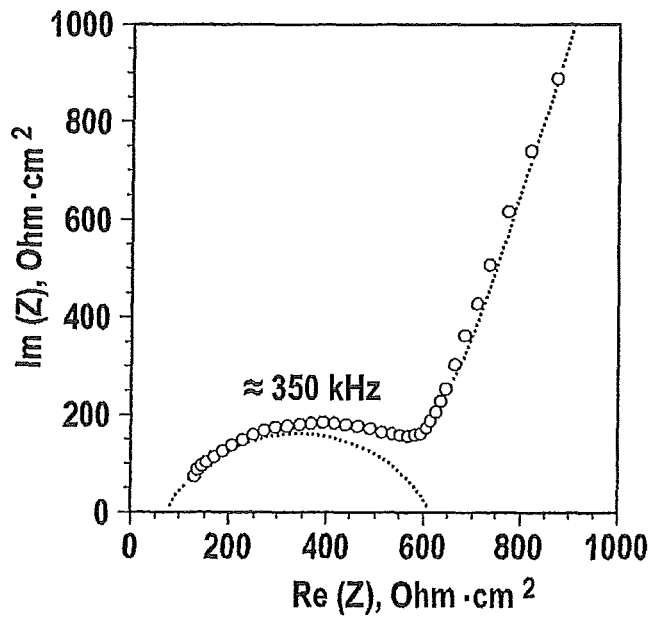
FIG. 1 represents an impedance plot for non-modified LAGP membrane, demonstrating a conductivity $1 \times 10^{-4}$ $Ohm^{-1}cm^{-1}$.

FIG. 1 shows an impedance plot for non-modified LAGP membrane, demonstrating a conductivity of $1 \times 10^{-4}$ $Ohm^{-1}cm^{-1}$.

In the real/imaginary-graph according to FIG. 1, a non-modified, i.e. an LAGP $Li_{1+x}Al_xGe_{2-x}(PO_4)_3$ is shown which is however not treated according to the present disclosure.

The present disclosure is related to a solid electrolyte particularly lithium-conductive electrolyte which provides for a high lithium-ion conductivity which is significantly higher than $10^{-4}$ $Ohm^{-1}cm^{-1}$ measured at room temperature (RT). The requirements for this solid electrolyte besides a high lithium-ion conductivity are chemical and electrochemical stability, gas tightness and good mechanic properties. The present disclosure particularly relates to LAGP solid electrolyte ($Li_{1+x}Al_xGe_{2-x}(PO_4)_3$). LAGP solid electrolytes are synthesized into variants, ceramics and glass-ceramics. Glass-ceramic is a more suitable process since it allows tailoring the material properties of the solid electrolyte obtained from a glass ceramic process. The main disadvantage of glass ceramic process is the rather complicated production: a non-uniform crystallization of glass results in a nonhomogeneous distribution of functional properties such as ionic conductivity, which in turn significantly decreases the performance of a battery. In addition to uniform glass crystallization of the LAGP system, the production of glass-ceramics with small crystal size (csr) is necessary for the creation of suitable solid electrolyte to be applied in Lithium/Air, Lithium/Sulfur, metal lithium-polymer batteries.

It has been found that in order to obtain uniform membranes of the LAGP-system solid electrolytes to use crystallization nucleation agents which are able to crystallize in the glass-system prior to the crystallization of the main lithium-conductive phase. Additives as crystallization nucleation agents also have to be inert with respect to the glass matrix, not utilizing main phase components during the crystallization process. Two groups of crystallization nucleation agents are suitable for the LAGP system: metals on the one hand, preferable Au, Pt, and Ag and inert ceramics, such as $Y_2O_3$ on the other hand. Besides $ZrO_2$ and MgO are also possible for such application as crystallization agent. An approximate percentage range is similar to $Y_2O_3$ Annealing profiles are expected to be close with respect to those suggested for $Y_2O_3$, Additives as the crystal nucleation agents, for instance the aforementioned metals and the aforementioned inert ceramics are chemically and electrochemically stable. Particularly, modified glass-ceramic electrolytes according to the present disclosure have a much significantly higher ionic conductivity as will be shown in FIGS. 2 and 3.

Figure 2:
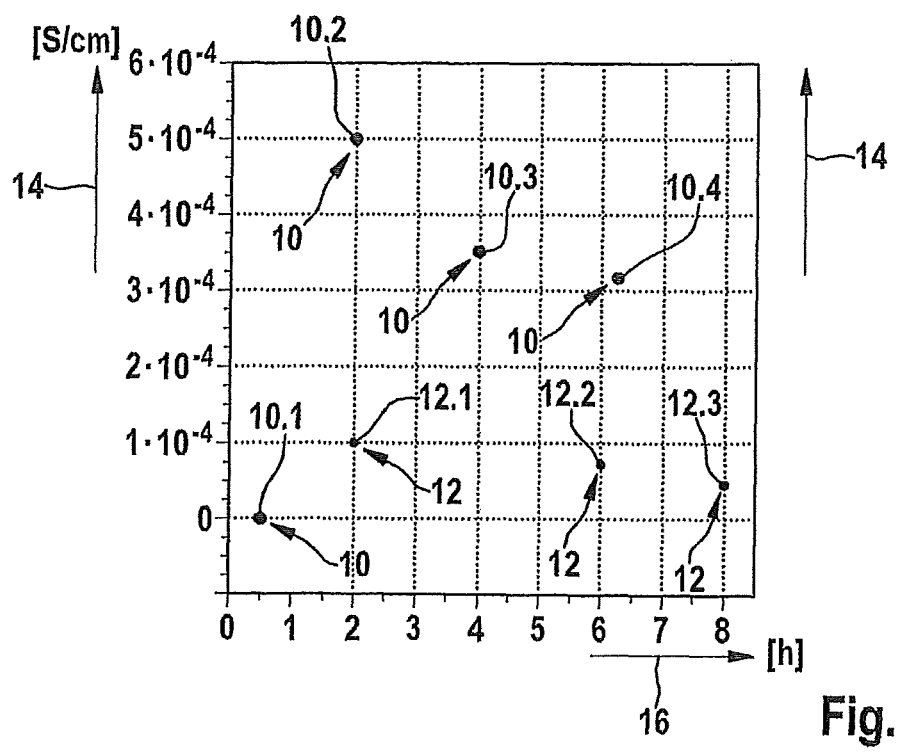
FIG. 2 shows a comparison of ionic conductivity in non-modified and ittria modified LAGP systems.

FIG. 2 shows a comparison of the ionic conductivity in a non-modified and an ittria modified LAGP-systems.

In FIG. 2, ionic conductivity 14 [S/cm] is shown for modified LAGP's 10 as well as for non-modified LAGP's 12. An ionic conductivity is shown for both materials vs. crystallization time in [h].

As can be derived from the graph according to FIG. 2, ionic conductivity of a first sample 10.1 of modified LAGP is very low given a crystallization time of 0.5 h. With respect to a second sample of the modified LAGP, see reference numeral 10.2, after a crystallization time of 2 hours, an ionic conductivity 14 of $5 \cdot 10^{-4}$ S/cm is shown compared to a non-modified first sample 12.1, which has a ionic conductivity of $1 \times 10^{-4}$ S/cm only.

Likewise, the ionic conductivity 14 of the third sample of the modified LAGP, see reference numeral 10.3, after four hours of crystallization time is much higher as compared to all samples 12.1, 12.2, 12.3 of the non-modified LAGP-system.

As it becomes clear from the graph according to FIG. 2, the electrolyte samples containing 5% of ittria ($Y_2O_3$), annealed at a crystallization temperature of 750° C. for two hours, have a ionic conductivity of $5 \times 10^{-4}$ $Ohm^{-1}cm^{-1}$, which is up to five times higher than the non-modified LAGP systems, compare the third 1st non-modified LAGP, see reference numeral 12.1, the 2nd non-modified LAGP, see reference numeral 12.2, as well as the 3rd non-modified LAGP, see reference numeral 12.3 in FIG. 2.

Figure 3:
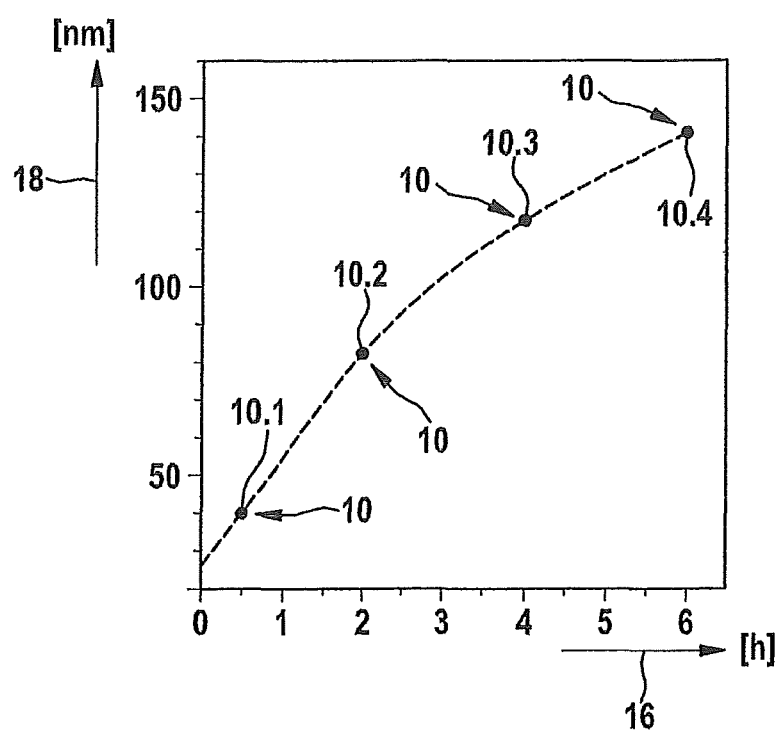
FIG. 3 shows the ionic conductivity of LAGP glass-ceramic membranes modified with $Y_2O_3$ vs. glass crystallization time

In FIG. 3, ionic conductivity of LAGP glass-ceramic membranes modified with $Y_2O_3$ and crystal size range 18 vs. glass crystallization time is shown. According to the graph of FIG. 3, the modified LAGP's 10, see 1st modified LAGP 10.1, 2nd modified LAGP 10.2, 3rd modified LAGP 10.3 and 4th modified LAGP 10.4 with a prolongation of crystallization time 16 [h] each demonstrate an increase in ionic conductivity 14. FIG. 3 clearly shows the influence of the crystallization time of modified LAGP-systems when modified with a crystal nucleation agent such as an inert ceramics, $Y_2O_3$ for instance. It is observed elongation of crystallization time 16 leads to an enhanced crystal size range 18 and enhanced ionic conductivity 14.

In case of modification with $Y_2O_3$ (and other inert ceramics), the range is from 1% 25 up to 10%, in case of modification by metals, such as Au, Ag, Pt, the range is from 1 ppm up to 100 ppm, due to various solubility of ceramics and metals in glass melt.

According to a method to produce solid electrolyte, particularly LAGP ($Li_{1+x}Al_xGe_{2-x}(PO_4)_3$) in a glass-ceramics process, the following method steps are to be performed: glass-ceramic solid electrolytes were studied by electrochemical impedance spectroscopy (EIS)-related techniques. In order to modify an LAGP system with crystallization nucleation agents, such as Y20 3, or metals, such as Au, Ag or Pt, salts were added to a glass melt at a temperature of between 1000° C. and 1400° C., preferably at 1300° C. At these temperatures, the additives, i.e. crystallization nucleation agents as listed above, were completely dissolved in the glass melt. This in turn allows to form uniform glass plates via quenching, for instance between two steel plates. The glass plates obtained were annealed at temperatures 10° C. higher than the vitrification point in order to relieve mechanical stress after the quenching process.

Prepared glass plates were annealed according to a two-stage program including crystallization of crystal nucleation agents (e.g. in case of $Y_2O_3$ additive 650° C.) and before crystallization of the main lithium-conductive phase (e.g. in case of $Y_2O_3$ additive 750° C.). Glass-ceramic process obtained electrolytes were studied via electrochemical impedance spectroscopy techniques.

It has been found that an addition of metal nanoparticles such as Au, Pt, Ag results in growth of conductivity values up to $3 \times 10^{-4}$ $Ohm^{-1}cm^{-1}$. An addition of ittria ($Y_2O_3$) as inert ceramics to LAGP glass allows increasing ionic conductivity 14 up to $5 \times 10^{-4}$ $Ohm^{-1}cm^{-1}$. A gas permeability testing with oxygen shows that membranes of the solid electrolytes are gas tight. In case an annealing time is required, the process is conducted as follows:

30 min annealing at 650° C., then air hardening, afterwards annealing at 750° C. for 2 hours for sample with $5 \times 10^{-4}$ S/cm. Thus, two annealing steps are performed at different temperatures, i.e. 650° C. and 750° C. and at different annealing times.

According to the present disclosure, a modification of a solid electrolyte obtained from glass-ceramic process as outlined above with crystal nucleation agents, such as the metals Au, Ag, or Pt or using an inert ceramics, such as $Y_2O_3$, allows to produce initially thinner glass-ceramic discs, which in turn allows for lowering the thickness of a layer to be polished during membrane vibration which in turn significantly decreases material consumption, i.e. renders the method of synthesizing more economical.

Figure 4:
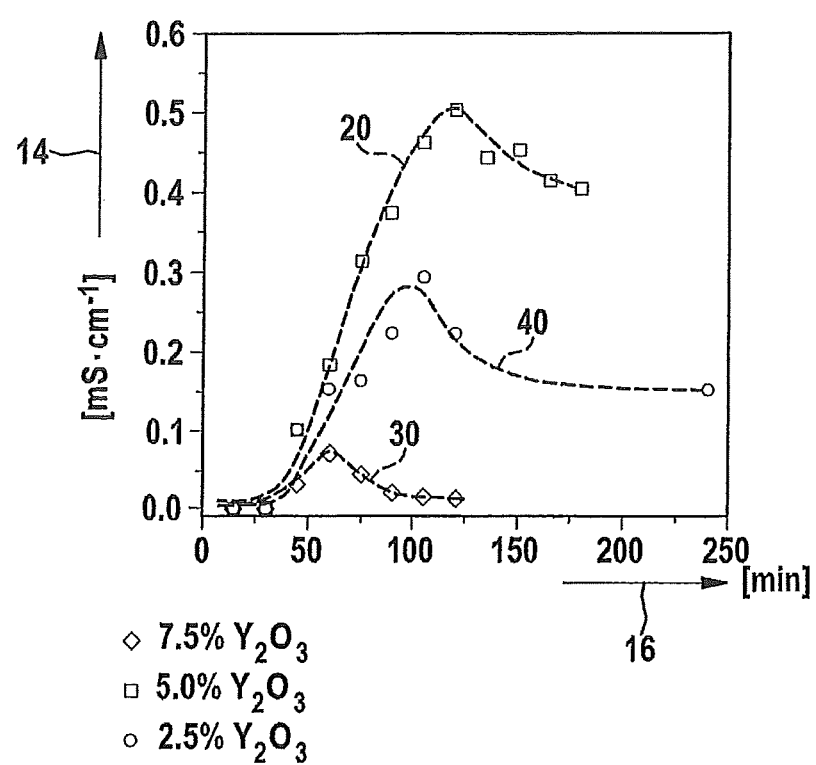
FIG. 4 shows ionic conductivity of LAGP membranes modified with different contents of $Y_2O_3$ inert ceramics.

FIG. 4 shows ionic conductivity of LAGP membranes modified with different contents of inert ceramics, such as $Y_2O_3$.

In FIG. 4, ionic conductivity 14 in [mS×cm$^{-1}$] is shown versus crystallization time 16 in minutes [min]. It is observed that modified LAGP's 10 when modified by 5% Y 203 content at a crystallization time 16 between and 100 min and 150 min have a maximum value of ionic conductivity of 0.5 [mS×cm$^{-1}$]. If according to the 2nd graph of modified LAGP's 30, the content of inert ceramics as $Y_2O_3$ is chosen to be 7.5%, the maximum ionic conductivity 14 of approximately 0.1 mS/cm$^{-1}$ is reached after a crystallization of approximately one hour.

If, however, the content of inert ceramics, such as $Y_2O_3$, is chosen to be 2.5% in a modified LAGP's 10, a 3rd graph 40 is observed according to which the maximum ionic conductivity 14 [mS×cm$^{-1}$] of about 0.3 is reached after a crystallization time 16 of approximately 100 min. have elapsed.

From the graphs 20, 30 and 40 respectively shown in FIG. 4, i.e. ionic conductivity 14 vs. crystallization time, it can be derived that a content of 5% inert ceramics as $Y_2O_3$ offers modified LAGP's 10 with a maximum ionic conductivity of 0.5 mS×cm$^{-1}$.

What is claimed is:

1. A method of synthesizing LAGP ($Li_{1+x}Al_xGe_{2-x}(PO_4)_3$) in a glass-ceramics process, comprising:
   (a) providing a crystallization agent which is configured to crystallize in a glass-ceramics process prior to a main lithium-conductive phase,
   (b) forming a glass melt at a temperature that is between 1000° C. and 1500° C.,
   (c) adding said crystallization agent and a crystallization nucleation agent to the glass melt,
   (d) quenching the glass melt to obtain uniform glass plates, and
   (e) annealing said glass plates in a two-stage heating program including
      crystallization of the crystal nucleation agent prior to crystallization of the main lithium-conductive phase and
      crystallization of the main lithium-conductive phase,
   (f) resulting in LAGP ($Li_{1+x}Al_xGe_{2-x}(PO_4)_3$).

2. The method according to claim 1, wherein said glass plates are annealed at temperatures 10° C. higher than a vitrification point of said glass plates.

3. The method according to claim 1, wherein said crystallization nucleation agent is free of use of a main phase component of said LAGP-system during crystallization.

4. The method according to claim 1, wherein said LAGP obtained by the method has an enhanced ionic conductivity compared to unmodified LAGP ($Li_{1+x}Al_xGe_{2-x}(PO_4)_3$).

5. The method according to claim 1, wherein the LAGP is modified by one of the following crystal nucleation agents: $Y_2O_3$, $ZrO_2$, MgO, Au, Ag, and Pt.

6. The method according to claim 1, wherein, in step (e), $Y_2O_3$ is used as the crystallization nucleation agent at a crystallization temperature in a range between 600° C. and 700° C.

7. The method according to claim 1, wherein, in step (e), crystallization of the main lithium-conductive phase occurs at crystallization temperatures between 700° C. and 800° C.

8. The method according to claim 1, wherein said LAGP contains as the crystallization nucleation agent, either (i) 1% to 10% of an inert ceramics, or (ii) 1 ppm up to 100 ppm of at least one of Au, Ag and Pt.

9. The method according to claim 1, wherein said crystal nucleation agent is inert with respect to a glass matrix of said glass ceramic process.

10. The method according to claim 1, wherein said crystal nucleation agent is chosen from a group consisting of metals and inert ceramics.

11. The method according to claim 10, wherein said metals consist of Au, Pt, and Ag.

12. The method according to claim 10, wherein said inert ceramics consist of $Y_2O_3$, $ZrO_2$, and MgO.

* * * * *